United States Patent [19]
Okada et al.

[11] 3,757,125
[45] Sept. 4, 1973

[54] OPTICAL TRACKING APPARATUS

[75] Inventors: Kazuo Okada, Suita-shi; Shigeru Ando, Toyonaka, both of Japan

[73] Assignee: Mitsubishi Denki Kabushiki Kaisha, Tokyo, Japan

[22] Filed: Dec. 17, 1971

[21] Appl. No.: 209,061

[30] Foreign Application Priority Data
Dec. 26, 1970 Japan.............................. 45/123921
Dec. 26, 1970 Japan.............................. 45/123923
Oct. 13, 1971 Japan.............................. 46/80740

[52] U.S. Cl............. 250/202, 219/125 PL, 250/234
[51] Int. Cl. .......................................... G06k 11/02
[58] Field of Search............ 250/202, 234, 219 QA; 219/125 PL

[56] References Cited
UNITED STATES PATENTS
3,260,848   7/1966   Gordon.............................. 250/202
FOREIGN PATENTS OR APPLICATIONS
224,178   10/1972   U.S.S.R.............................. 250/202

*Primary Examiner*—James W. Lawrence
*Assistant Examiner*—T. N. Grigsby
*Attorney*—Oblon, Fisher & Spivak

[57] ABSTRACT

This invention consists of an optical tracking apparatus comprising a source of parallel light, such as laser, which irradiates the object to be tracked. A light scanning device, which is disposed between the source of parallel light and the object, is provided to deflect or scan the light from the source across the object to be tracked. A convex lens is provided to focus light reflected from the object. A light detector is provided which receives the reflected light and converts it into an electrical signal. The output of the light detector is fed to a phase detector which senses its phase with reference to the phase of the scanning device. Deviation of the scanning center of the scanned light from a selected position on the object to be tracked is detected, and a servo-system is provided to reduce the deviation to zero.

4 Claims, 59 Drawing Figures

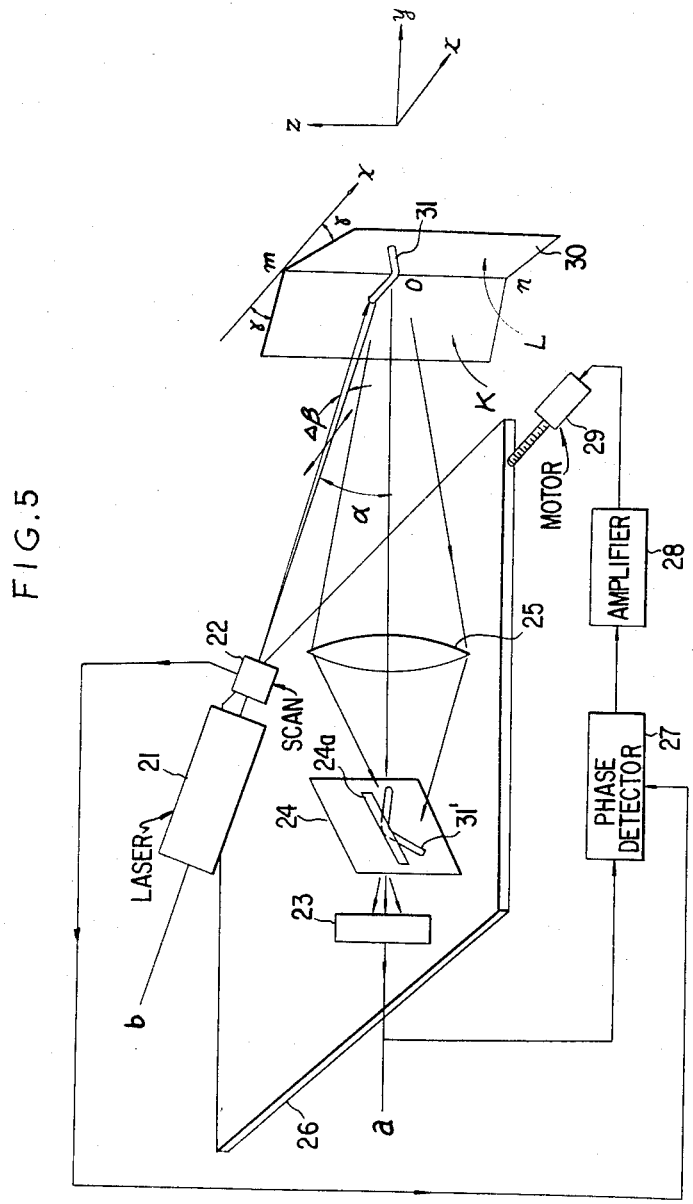

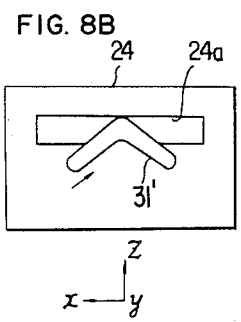
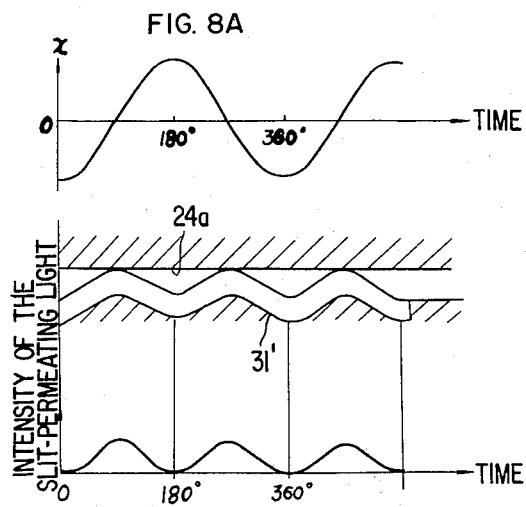
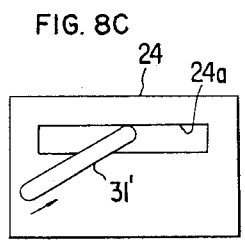
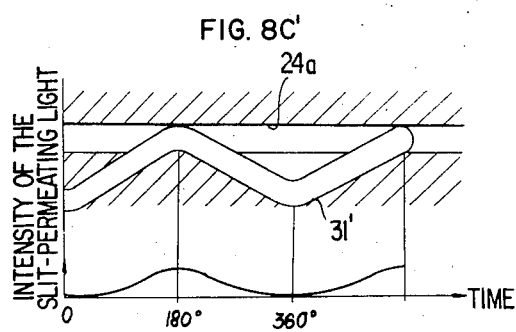
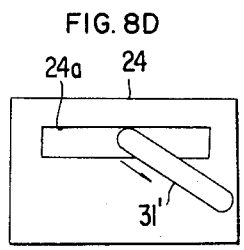
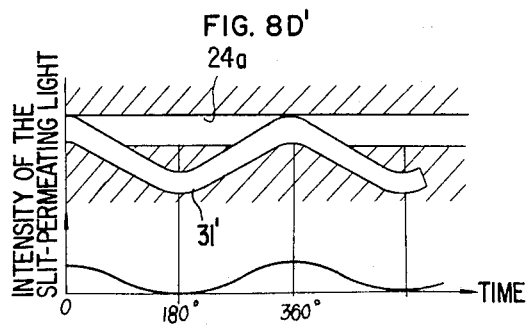

FIG. 16A
FIG. 16B
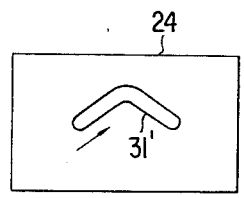
FIG. 16B'
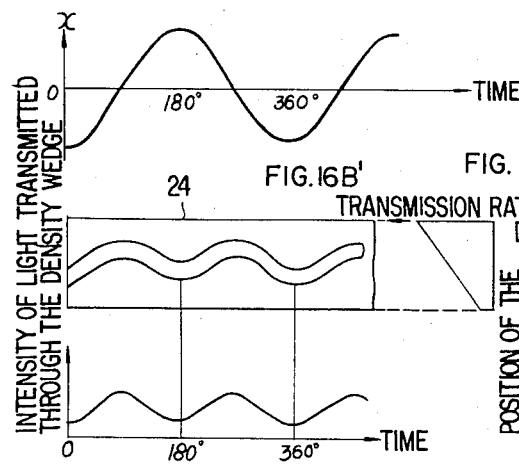
FIG. 16E
FIG. 16C
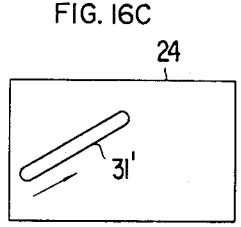
FIG. 16C'
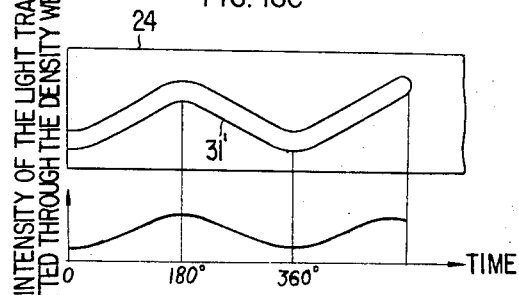
FIG. 16D
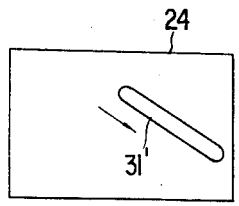
FIG. 16D'
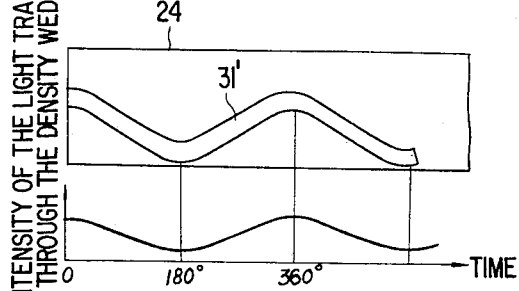

OPTICAL TRACKING APPARATUS

A slit plate, which has a slit oriented substantially parallel to the scanning direction, may be provided between the lens and the light detector. Alternatively, an optical density wedge may be provided, having a transmission factor which varies in a direction orthogonal to the scanning direction, and on which the light from the lens is focused.

BACKGROUND OF THE INVENTION

1. Field of the Invention

This invention relates to optical tracking apparatus, and more particularly to an apparatus which tracks an object, or the position of the clearance between two bodies, or a marking line, or an edge line of a body, etc., without physical contact.

2. Description of the Prior Art

In, for example, the automation of welding, it is required to detect the position of the butt line between two plates, and a marking line, or white line drawn along a desired weld line. Heretofore, gaps or marking lines, etc., have been detected by a contact piece. The use of contact pieces, however, has been unsatisfactory in that the contact pieces may cause tracking errors due to high welding temperatures. In addition, since the contact pieces may not be brought into the vicinity of an actual welding point, they may be particularly inaccurate in tracking curved weld lines.

In the automation of a fillet weld, for example, it is necessary to detect the edge between two plates to be welded. The most common means for detecting the edge is to use a contact piece which follows the edge profile. However, such devices have been disadvantageous in that errors are caused by the heat of welding, and, where a weld line is curved, unless the spacing between the welding position and the detecting position is small, the error is large. Yet the spacing may not be made small enough with the contact system, due to the effect of heat on the contact piece.

SUMMARY OF THE INVENTION

Accordingly, one object of this invention is to provide a novel optical tracking apparatus which does not require physical contact with a workpiece.

Another object of this invention is to provide a novel tracking apparatus which is reliable and highly accurate in following weld lines of any shape.

Yet another object of this invention is the provision of a novel optical tracking apparatus capable of detecting both linear and angular movements of a workpiece.

Briefly, these and other objects of the invention are achieved by providing an optical tracking apparatus comprising a source of parallel light which irradiates the body to be tracked, a light scanning device which is disposed between the source of parallel light and the body which deflects and scans the light from the source of parallel light across the object to be tracked. A lens is provided which focuses light reflected from said body. A light detector detects focused light, and a servo-system detects the phase of the output of the light detector with reference to the phase of the deflection or scanning device. The servo-system detects the deviation of the scanning center of the scanned light from the center of said object to be tracked, and effects a control so as to make said deviation zero.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 5 is a perspective and block diagram showing another embodiment of the optical tracking apparatus according to this invention;

FIGS. 8A–8D and 8B'–8D' are diagrams explaining the principle of the detection of an edge using the apparatus of FIG. 5;

FIGS. 16A–16D and 16B'–16D' are diagrams explaining the principle of the detection of an edge using the apparatus of FIG. 13;

DESCRIPTION OF THE PREFERRED EMBODIMENTS

Figure 1:
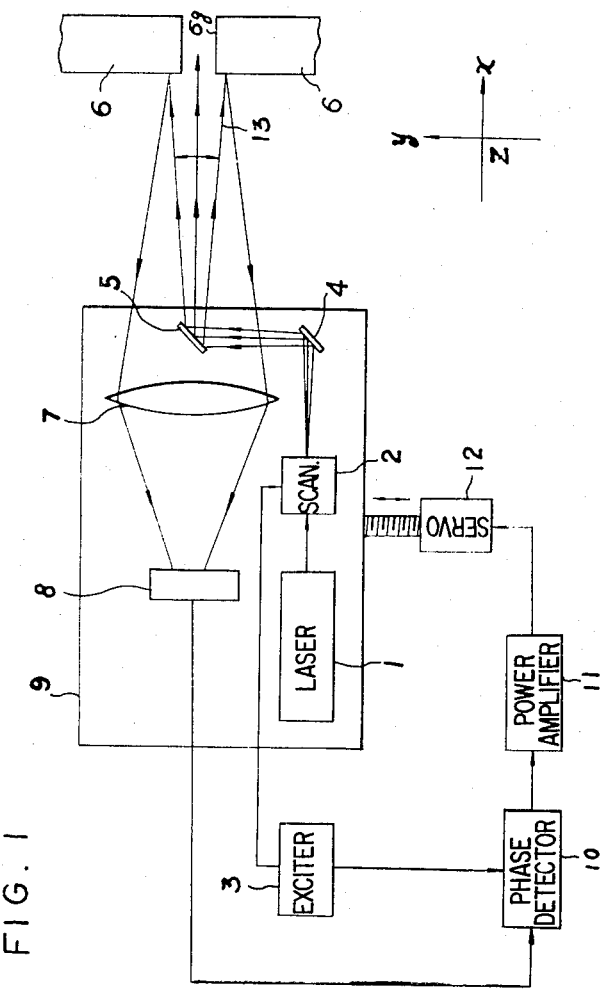
FIG. 1 is a block diagram showing one embodiment of the optical tracking apparatus according to this invention.

Referring now to the drawings wherein like reference numerals designate identical or corresponding parts throughout the several views, and more particularly to FIG. 1 thereof, one embodiment of the present invention is illustrated. In the figure, numeral 1 designates a source of parallel light, such as laser 2 a light scanning device which deflects and scans the parallel light in the direction of y-axis at a recurrence frequency $f_o$ (the deflection and scanning being hereinafter simply termed the "scanning"), 3 an exciter device or scanning signal generator which actuates the light scanning device, 4 and 5 reflectors which direct the scanned light (scanning light) to a workpiece or specimen 6 having a gap 6g. The numeral 7 denotes a lens which condenses light reflected from the specimen, 8 a light detector, such as a photocell, which converts the condensed light into an electric signal, 9 a moving stand which moves in the direction of the y-axis, 10 a phase detector device which detects the phase of the output signal of the light detector 8 with reference to a signal from the exiter device 3, 11 a power amplifier, 12 a servomotor which drives the moving stand 9 according to the output of the power amplifier. The numeral 13 represents the light beams.

The principle of operation of the present invention will now be described. Although the parallel-light source 1 may also be a combination of a point source of light and a lens, a laser is typically employed in order to enhance the precision of the apparatus. The light emanating from the parallel-light source 1 is scanned in parallel with the y-axis in FIG. 1 at the recurrence frequency $f_o$ by means of the light scanning device 2. Used as the light scanning device is, for example, a means which utilizes a well-known electrooptical effect. The scanning light is projected over the gap portion of the specimen 6 through the reflectors 4 and 5. The width of the scan is selected so as to be slightly larger than the gap in the workpiece or specimen. In FIG. 1, there is depicted a situation where the center of the scanning light coincides with the center of the gap. The scanning light incident on the specimen is reflected when the light beam impinges on the gap. The reflected light is condensed and focused on the light detector 8 by the lens 7, and is converted into an electric signal representative of the intensity of the light. This electric signal is detected by the phase detector 10, with a signal from the exciter device 3 acting as a reference signal.

Figure 2:
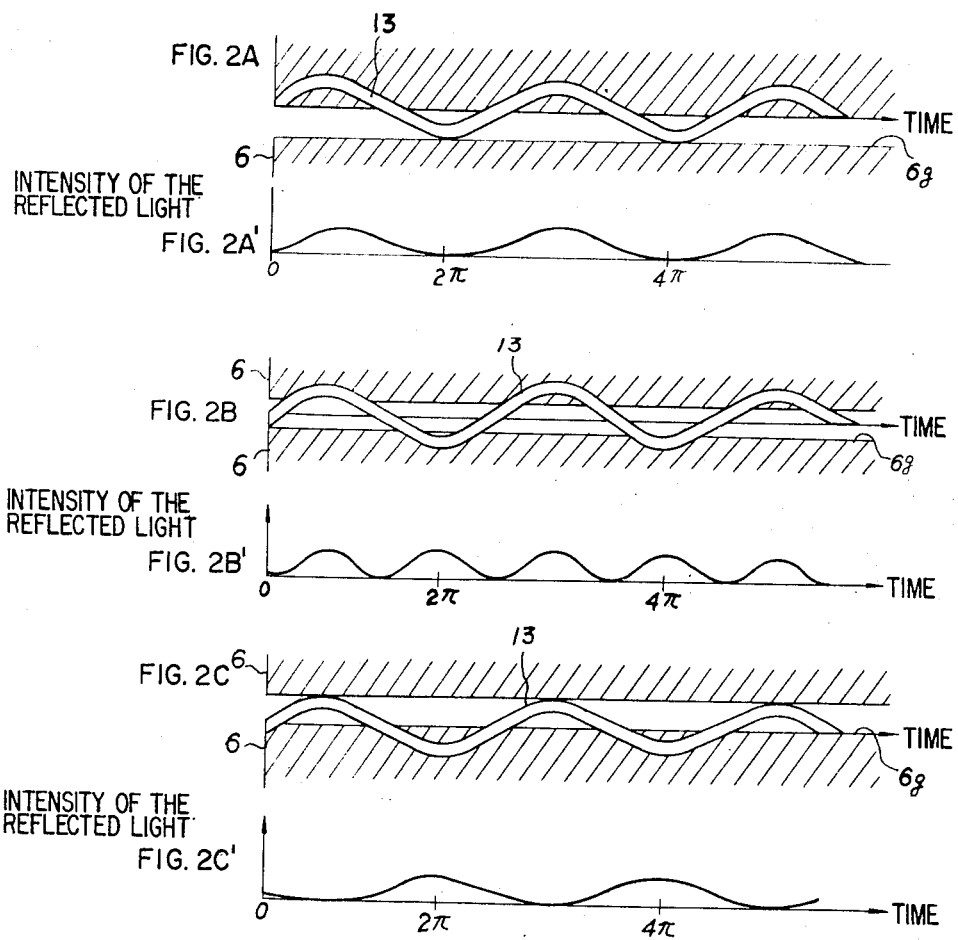
FIGS. 2A–2C and 2A'–2C' are three part graphical diagrams for explaining the principle of the detection of a gap using the apparatus of FIG. 1.

The functions thus far described will be explained in detail with reference to FIGS. 2A-2C and 2A'-2C'. FIGS. 2A, 2B and 2C illustrate the progress-versus-time of the light beams 13 of the scanned light projected over the gap portion of the specimen. FIGS. 2A', 2B' and 2C' illustrate the progress-versus-time of the intensity of the reflected light from the specimen 6. FIGS. 2A and 2A' show a situation where the scanning center and the center of the gap deviate, FIGS. 2B and 2B' show a situation where they are coincident, and FIGS. 2C and 2C' show a case where they deviate in the opposite sense from that of FIGS. 2A and 2A'.

In the respective figures, the time axes are depicted graduated in terms of phase. In case of FIG. 2A, the intensity of the reflected light varies by one period during one period of scanning. It is to be understood that, when the scanning center and the gap center are brought into coincidence, as in FIG. 2B, the intensity of the reflected light varies two periods or cycles during one scanning period. In FIG. 2C, there appears a reflected-light intensity which is the same in period as, but differs in phase (by $\pi$ or 180°) from, the case of FIG. 2A. More specifically, the intensity of the reflected light in the case of FIG. 2B has a varying component of frequency $2f_o$, while a varying component of frequency $f_o$ appears in the cases of FIGS. 2A and 2B, with the result that the phase differs by $\pi$ between the cases of FIGS. 2A and 2C as described above. When the relative position between the scanning center and the gap center is intermediate between the cases of FIGS. 2A and 2B or between those of FIGS. 2B and 2C, variations in the intensity of the reflected light have components of both frequencies $f_o$ and $2f_o$.

Figure 4:
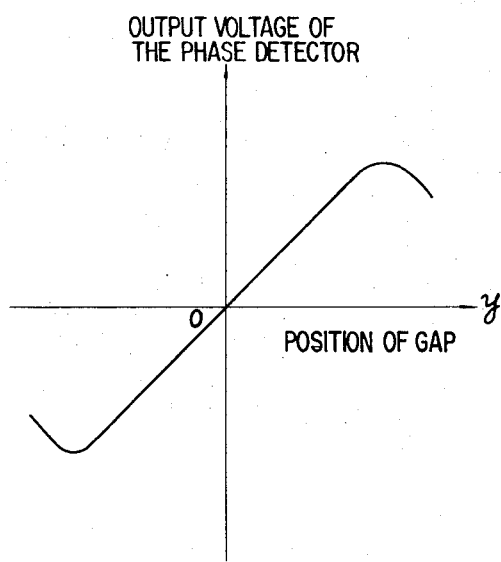
FIG. 4 is a graphical diagram showing an output characteristic of the apparatus of FIG. 1.

It is apparent from the above explanation that, if the output signal of the light detector is phase-detected, with the signal of the exciter device as a reference signal, an output signal of a characteristic as in FIG. 4 is obtained. This signal is amplified by the power amplifier 11, the amplified signal is applied to the servomotor 12, and the moving stand 9 is driven with the polarities of the servomotor suitably selected. Then, the apparatus may be controlled so that the scanning center and the gap center may be brought into coincidence. When the specimen or the moving stand is moved in the direction of z-axis, the moving stand 9 normally detects and tracks the profile of the gap. Accordingly, if by way of example, the present invention is applied to a welding machine, and a welding torch is placed on the moving stand, the apparatus automatically detects curves in the gap or weld lines, and carries out welding.

Figure 3:
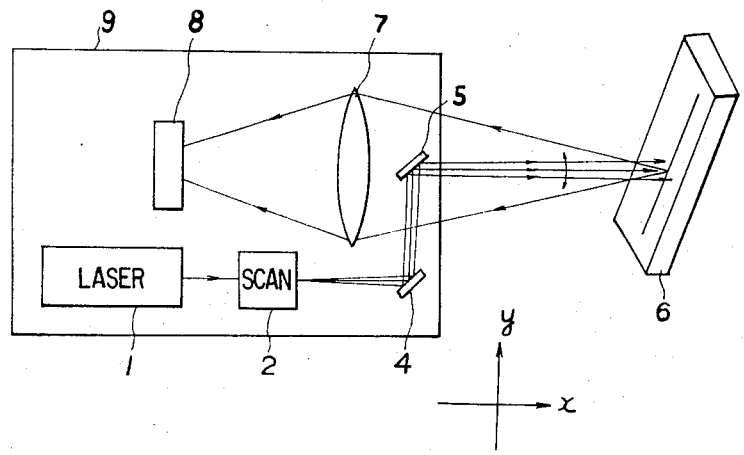
FIG. 3 is a schematic diagram showing one technique for the detection of a marking line using the apparatus of FIG. 1.

FIG. 3 shows an embodiment in which, instead of the gap in FIG. 1, a marking line or white line is detected. When the light is passed across the marking or white line in the scanning step, the light is reflected at the position of the line and is projected into the lens 7. When the scanning center corresponds to the marking line, a frequency component $2f_o$ results in the intensity of the reflected light. When the scanning center is varied in the direction of y-axis from the marking line, a component of frequency $f_o$ results. The phenomenon may be more clearly understood by considering the previously described gap as the marking line of FIG. 3. Accordingly, the moving stand 9 can be servocontrolled so as to make the scanning center correspond to the marking line by the out-put of the system. In accordance with the embodiments of this invention, the gap, the marking line, or the white line, etc., can be scanned to control welding and other automatic apparatuses.

The system of the present invention has the advantage of no contact with the workpiece, as well as the advantage that the effects of other spurious light can be minimized by using a laser. In addition, a high ratio of signal to noise is provided whereby a high accuracy is obtained in the detector. Incidentally, although in the embodiments of this invention, there are illustrated by way of example the gap, the marking line and the white line, the invention is not intended to be limited in any manner.

FIG. 5 shows another embodiment according to the present invention. In the figure, the numeral 21 indicates a source of parallel light, such as laser, 22 a light scanning device which deflects and scans the light in the direction of the x-axis (the deflection and scanning being hereinbelow simply termed the "scanning"). The numeral 23 denotes a light detector or transducer which converts into an electric signal the light focused by a lens 25 and received through a slit plate 24 having a slit 24a. The lens 25 focuses on the slit plate 24 the light reflected from a specimen body. The numeral 26 denotes a moving stand, which is driven in the direction of the x-axis in the drawing by means of a driving motor 29. The parallel-light source 21, the light scanning device 22, the light detector 23, the slit plate 24, and the lens 25 are mounted on the moving stand 26. Numeral 27 represents a phase detector which detects the phase of the output signal from the light detector 23 with reference to a signal from the light scanning device 22. The numeral 28 designates a power amplifier which amplifies an output of the phase detector 27, and 29 represents a servomotor which drives the moving stand 26 through the output of the power amplifier 28. The numeral 30 designates the body to be measured which consists of two faces K and L which have a common edge $\overline{mn}$. The numerals 31 and 31' denote the loci of the light beams.

The operating principles of this embodiment will now be described. Although the parallel-light source 21 may also be a combination of a point source of light and a lens, a gas laser is typically employed in order to enhance the precision of the apparatus. The light emanating from the parallel-light source 21 is scanned in parallel with the x-axis illustrated in FIG. 5 at a recurrence frequency of $f_o$ by means of the light scanning device 22. The light scanning device 22 may be a means which utilizes a well-known electooptical effect, for example. For simplicity, the scanning device 22 may consist of a plane mirror stuck to one end of a tuning fork of a tuning fork oscillator. The parallel light is then caused to impinge upon the plane mirror, whereby a scanned and reflected parallel light may be obtained. The scanning angle $\Delta\beta$ is typically $2.5 \times 10^{-2}$ radians or so, and, for example, where the distance between the light scanning device 22 and the body to be measured 30 is 200mm, the width of deflection of the parallel light is 5 mm on the body to be measured. An optical axis $\overline{bo}$ of the parallel-light source 21 and an optical axis $\overline{ao}$ of the lens 25 are contained in the yz-plane as shown, and both the optical axes are so set as to define an angle of $\alpha$ within the plane. Typically, the angle $\alpha$ is approximately $2 \times 10^{-1}$ radians.

Figure 6A:
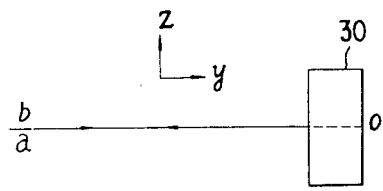
FIGS. 6a, 6b, and 6b' are diagrams explaining the principle of the detection of an edge using the apparatus of FIG. 5.
Figure 6A:
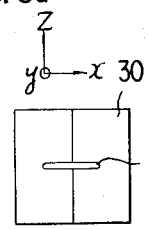
Figure 6B:
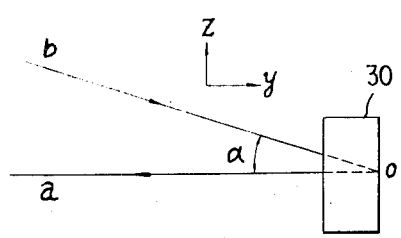
Figure 6B:
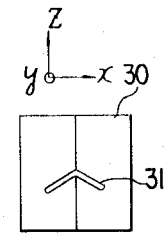

Loci of the scanned parallel light on the surfaces of the body to be measured 30, are shown in FIGS. 6a, 6b, 6a' and 6b'. FIG. 6a illustrates a case where the optical axes $\overline{bo}$ and $\overline{ao}$ are coincident. Here, the locus of light as observed in the direction from a to o along the y-axis becomes a straight line, parallel to the x-axis as also shown in FIG. 6a'. In contrast, in the case where the observational direction $\overline{ao}$ defines the angle $\alpha$ with the optical axis $\overline{bo}$, as shown in FIG. 6b, the locus of light as viewed in the direction from a to o becomes a polygonal line, as shown in FIG. 6b'.

Figure 7A:
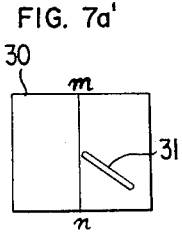
FIGS. 7a–7c and 7a'–7c' are diagrams explaining the principle of the detection of an edge using the apparatus of FIG. 5.
Figure 7B:
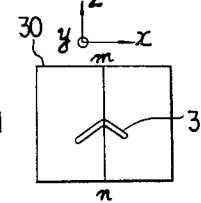
Figure 7C:
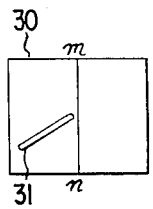
Figure 7A:
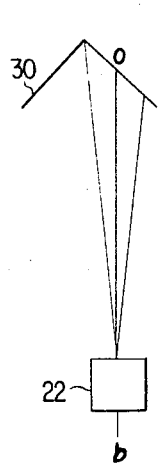
Figure 7B:
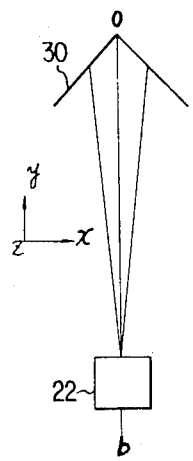
Figure 7C:
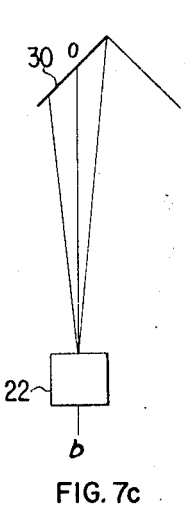

The body to be measured 30 consists of both the planes K and L. The edge $\overline{mn}$ thereof passes through the point o and is parallel to the z-axis, and an angle which the planes K and L define with the x-axis, respectively, is typically 45°. The locus of the scanned light in this case appears, as illustrated in FIGS. 7a–7c and 7a'–7c'. In FIG. 7b a situation is illustrated where the scanning center axis $\overline{bo}$ of the scanned parallel light and the edge $\overline{mn}$ of the body to be measured 30 are brought into coincidence. If the position of the body to be measured is changed as in FIGS. 7a and 7c, the corresponding loci of the scanned light becomes as shown in FIGS. 7a' and 7c'.

Next, the light reflected from the planes of the body to be measured 30 is condensed by the lens 25 and is focused on the slit plate 24 oriented parallel with the xz-plane. The slit 24a is disposed in parallel with the x-axis in FIG. 5, and its width is approximately equal to the width of the light locus 31' on the slit plate 24. The position of the slit plate 24 in the direction of z-axis is adjusted as shown in FIG. 5, so that in the case where the edge of the body to be measured is coincident with the optical axis $\overline{bo}$ (in the case of FIG. 7b), the bent portion may coincide with the slit.

The light having passed through the slit 24 impinges on the light detector 23, and the intensity thereof is converted into an electric signal to be fed into the phase detector 27.

The wave form of the drive voltage of the light scanning device 22 is used as the reference signal of the phase detector 27. A positive or negative DC signal appears on the output side of the phase detector 27, depending upon whether the phase difference between the reference signal and the signal from the light detector 23 is 0° or 180°.

Figure 9:
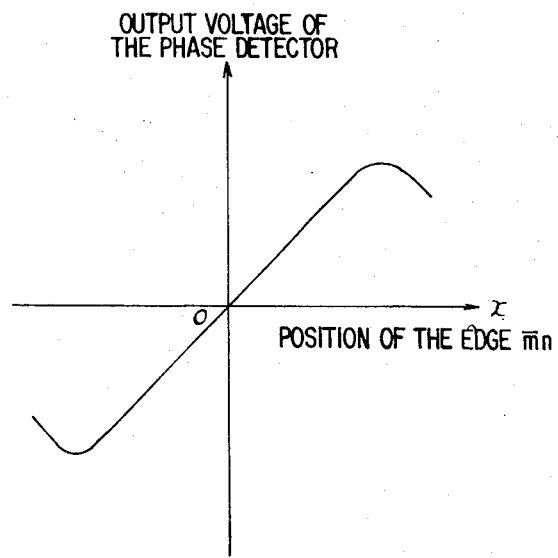
FIG. 9 is a graphical diagram showing an output characteristic of the apparatus of FIG. 5.

The functions of the apparatus as thus far described, will be explained in more detail with reference to FIGS. 8A–8D and 8B'–8D'. The loci of light beams focused on the slit plate 24 are shown in FIGS. 8B, 8C and 8D, while the corresponding progress-versus time of the loci of light beams focused on the slit and the progress-versus-time of the intensities of slit-permeating light are illustrated in FIGS. 8B', 8C' and 8D', respectively. In the respective figures, the time axes are depicted as graduated in terms of the phase. FIG. 8B is directed to the case where the edge $\overline{mn}$ is coincident with the optical axis $\overline{bo}$, FIG. 8C to the case where the edge $\overline{mn}$ (and accordingly, the body to be measured) is displaced in the negative direction of the x-axis, and FIG. 8D to the case where it is displaced in the positive direction of the same axis. As is apparent from FIG. 8B, when the edge $\overline{mn}$ is coincident with the optical axis $\overline{bo}$, the intensity of the slit-permeating light varies by two periods while the parallel light effects one period of scanning. That is, the intensity of the slit-permeating light has a frequency component of $2f_o$. When the body to be measured is displaced in the negative direction of the x-axis as shown in FIG. 8C, the slit-permeating light has a frequency component of $f_o$. When the body to be measured is displaced in the positive direction of the x-axis, there is obtained a permeating light which, as shown in FIG. 8D, has a frequency component of $f_o$ varying in phase by 180° from the case of FIG. 8C. When the displacement is intermediate between the cases of FIGS. 8B and 8C or between those of FIGS. 8B and 8D, the frequency components of $f_o$ and $2f_o$ coexist, and the intensity of the component of $f_o$ is proportional to the displacement for small displacements. Accordingly, when the output of the light detector 23 is phase-detected, an output of a characteristic as shown in FIG. 9 is obtained.

The signal is amplified by the power amplifiers 28, the amplified signal is applied to the servomotor 29, and the feed stand 26 is thus driven, whereby the optical axis $\overline{bo}$ may be brought into coincidence with the edge $\overline{mn}$.

From the foregoing description, it is clear that the functions of the whole system are as set forth below.

An indication of the deviation between the scanning center of the scanning-light locus and the slit is obtained from the phase detector 27. This locus corresponds to the displacement of the edge of the body to be measured 30 in the x direction and appears on the slit plate 24. Upon this indication, the servomotor 29 is rotated to move the moving stand 26. The position of the scanning center is thereby moved to the position of the slit. Unless the edge $\overline{mn}$ is moved again, the above state is maintained. If the edge $\overline{mn}$ is displaced, the moving stand 26 effects tracking so as to make the displacement zero.

Accordingly, if, for example, the body to be measured is a body to be welded and $\overline{mn}$ is a weld line, the feed stand tracks the weld line. If means is also provided to move the feed stand in the direction of the z-axis, and a welding torch, for example, is placed on the feed stand, it becomes possible to automatically track the weld line and to carry out the welding even when the weld line is curved.

Figure 10A:
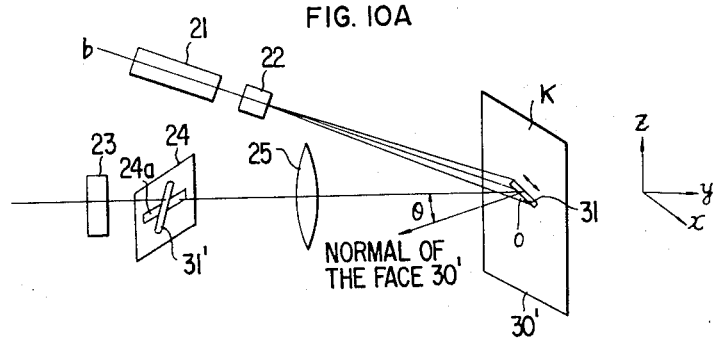
FIGS. 10A–10D and 10B'–10D' are diagrams explaining the principle of the detection of a displacement using the apparatus of FIG. 5.
Figure 10B:
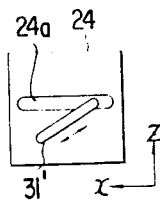
Figure 10B:
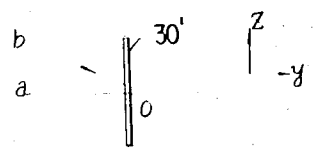
Figure 10C:
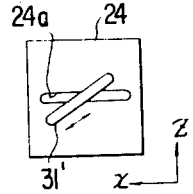
Figure 10C:
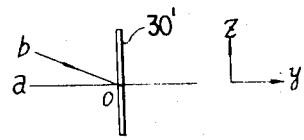
Figure 10D:
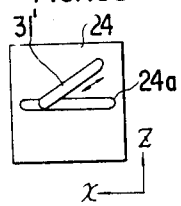
Figure 10D:
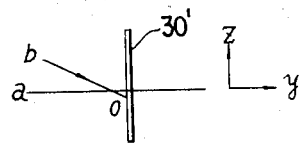

It will now be described that, as another function of the present invention, a displacement in the direction of the y-axis, or a distance in the direction of the y-axis, or a distance from the lens 25, may be detected. In FIG. 10A, there is shown a case where, in the constructional diagram of FIG. 5, it is assumed that the body to be measured 30 has only the surface K, and that the normal to the surface K be contained in the xy-plane and defines an angle $\theta$ with the optical axis $\overline{ao}$. The body is represented by the numeral 30'. When as in FIG. 10C, the surface of the body to be measured 30' is located at the intersection point o between the optical axis $\overline{bo}$ and the optical axis $\overline{ao}$, the locus of light on the slit plate 24 is such that the scanning center of the scanning light is located on the slit as shown in FIG. 10C. Therefore, the scanning light passes through the slit twice during one period of scanning, and a signal having a frequency component of $2f_o$ appears. On the other hand, when the body to be measured 30' is displaced towards the lens (FIG. 10B) or in the direction opposite thereto(FIG. 10D) on the y-axis, the scanning light is passed through the slit only once during one period of scanning, and a signal of a frequency component $f_o$ appears. Thus, the phase differs by 180° depending upon on which side of o the body to be measured 30' is located. Therefore, an output characteristic as in FIG. 9 may also be obtained from the phase detector. The moving stand 26 may be servo-driven in the direction of the y-axis by means of the output signal, whereby the intersection point o may be always positioned on the plane of the body to be measured 30'. Consequently, the displacement of the surface of the body to be measured in the y-axial direction may be read by reading the movement of the moving stand 26.

Figure 11A:
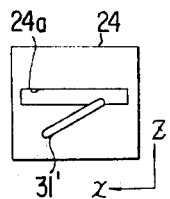
FIGS. 11A–11C and 11A'–11C' are diagrams explaining the principle of the detection of an angle using the apparatus of FIG. 5.
Figure 11A:
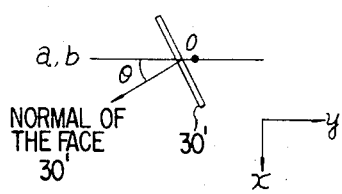
Figure 11B:
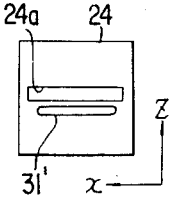
Figure 11B:
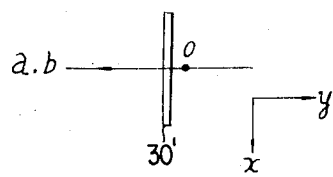
Figure 11C:
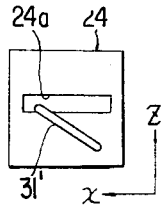
Figure 11C:
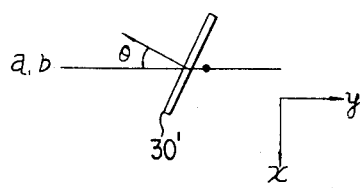
Figure 12:
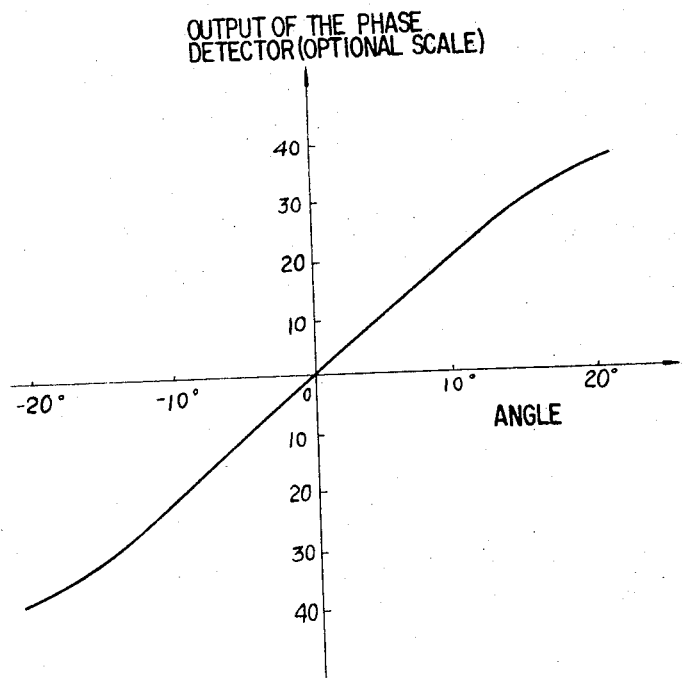
FIG. 12 is a graphical diagram showing an output characteristic of the angle detection apparatus of FIG. 5.

Referring to FIGS. 11A–11C and 11A'–11C' a technique will be described for measuring the angle $\theta$, as still another function of the present invention. It is now assumed that, as in the figure, the surface of the body to be measured 30' is slightly displaced onto the lens side on the y-axis. If the angle is $\theta$ as shown in FIG. 11A, the scanning light is passed through the slit on the slit plate 24 once during one period, and, hence, a signal having a frequency component $f_o$ is generated in the light detector 23. The intensity of the signal becomes lower as the angle $\theta$ approaches zero, and the signal is zero at $\theta=0$ as in FIG. 11B. When the situation is as shown in FIG. 11C, the frequency component $f_o$ appears again. However, the phase thereof differs by 180° from that of the situation shown in FIG. 11A. Accordingly, the output of the phase detector typically becomes as shown in FIG. 12.

The predicted results were obtained in an experiment in which a piece of plain white paper was used for the surface to be measured. In spite of the fact that the dependency upon the angle $\theta$ of the intensity of light incident on the lens 25 was not corrected, outputs substantially proportional to the angle were obtained within the range of $-20°<\theta<20°$. Thus, although non-contact measurements or control of an angle have been considered as being difficult in comparison with the measurement of a displacement, they are made possible using the present invention according to the above method.

Since the apparatus shown in FIG. 5 is constructed and operated as explained above, it is effective in tracking the edge of the specimen without any physical contact with the specimen.

Figure 13:
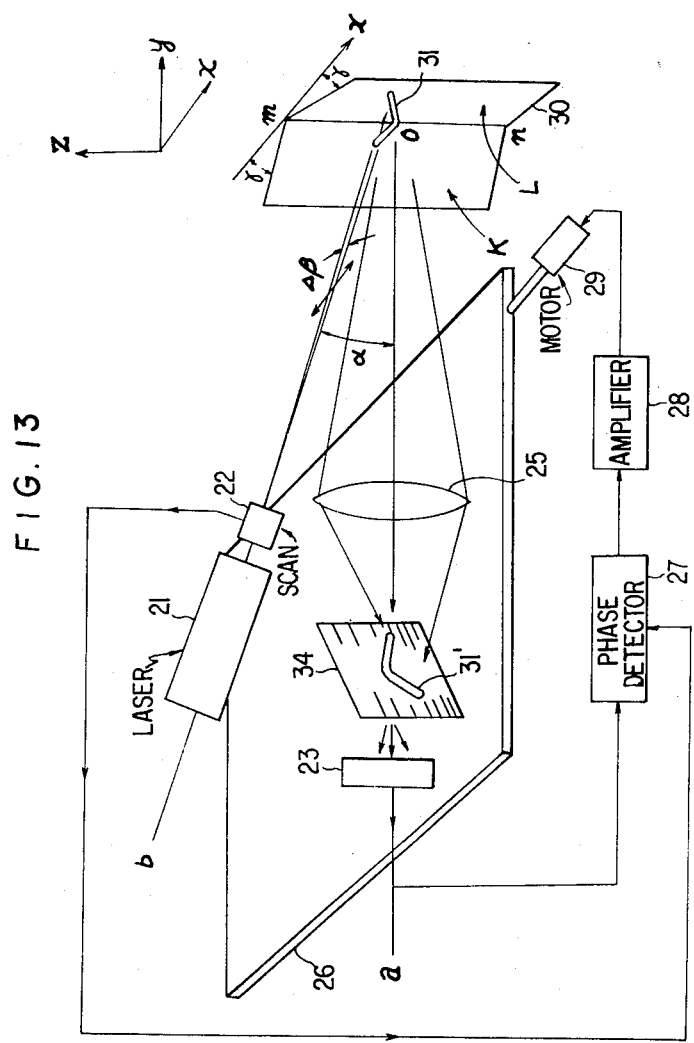
FIG. 13 is a perspective and block diagram showing still another embodiment of the optical tracking apparatus according to this invention.

FIG. 13 shows still another embodiment according to the present invention. The embodiment of the invention illustrated in FIG. 13 is identical with that illustrated in FIG. 5, except that the slit plate of the FIG. 5 embodiment is replaced with an optical density wedge 34 in the FIG. 13 embodiment. The optical density wedge, or "density wedge" 34 has a transmission factor gradient which increases in the positive direction of the z-axis shown in FIG. 13.

Figure 14A:
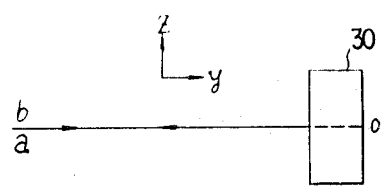
FIGS. 14a, 14b, 14a' and 14b' are diagrams explaining the principle of the detection of an edge using the apparatus of FIG. 13.
Figure 14A:
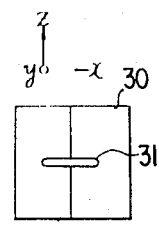
Figure 14B:
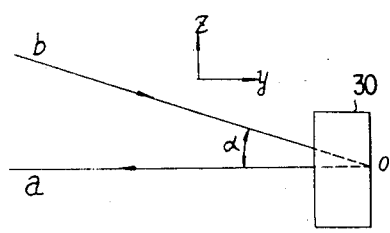
Figure 14B:
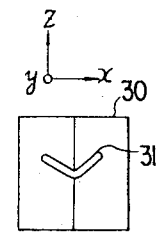

Loci of light which the scanned parallel light forms on the surfaces of the body to be measured 30, are shown in FIGS. 14a, 14b, 14a' and 14b' which are similar to FIGS. 6a, 6b, 6a' and 6b'. FIG. 14a illustrates a case where the optical axes $\overline{bo}$ and $\overline{ao}$ are coincident. Here, the locus of light, as observed in the direction from a to o along the y-axis, becomes a straight line parallel to the x-axis as shown in FIG. 14a'. In contrast, in a case where the observational direction $\overline{ao}$ defines the angle $\alpha$ with the optical axis $\overline{bo}$ as shown in FIG. 14b, the locus of light as viewed in the direction from a to o becomes a polygonal line as shown in FIG. 14b'.

Figure 15A:
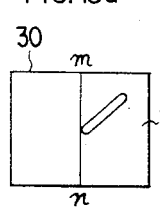
FIGS. 15a–15c and 15a'–15c' are diagrams explaining the principle of the detection of an edge using the apparatus of FIG. 13.
Figure 15B:
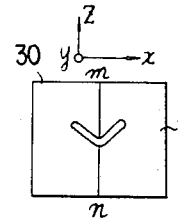
Figure 15C:
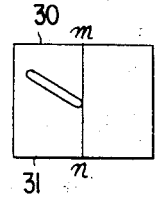
Figures 15A, 15B, 15C:
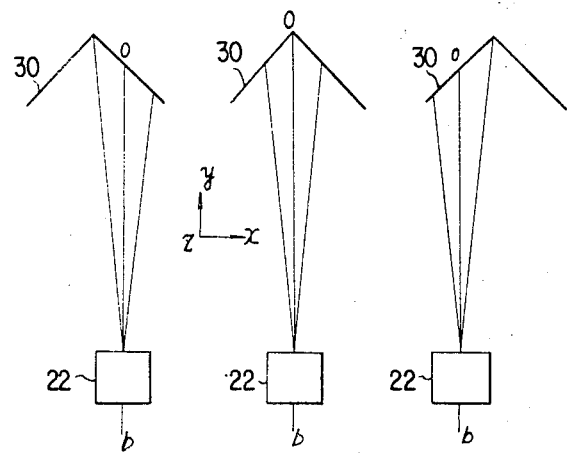

The body to be measured 30 consists of both the surfaces K and L, the edge $\overline{mn}$ thereof passes through the point o and is parallel to the z-axis. An angle which the surfaces K and L define with the z-axis, respectively, is typically 45°. The locus thereof appears, as illustrated in FIGS. 15a – 15c and 15a' to 15c' which are similar to FIGS. 7a – 7c and 7a' – 7c'. In the case of FIG. 15b, a situation is illustrated where the scanning center axis $\overline{bo}$ of the scanned parallel light and the edge $\overline{mn}$ of the body to be measured 30 are brought into coincidence. If the position of the body to be measured is changed as in FIGS. 15a and 15c, the corresponding loci of the scanned light become as shown in FIGS. 15a' and 15b'.

Next, the light reflected from the faces of the body to be measured 30 is condensed by the lens 25, and is focused on the density wedge 34 oriented parallel with the xz-plane. Since the density wedge 34 has variations in its transmission factor in the z-axial direction, the intensity of light transmitted through the density wedge 34 varies depending upon the incident position of the light in the direction of the z-axis.

The light having passed through the density wedge 34 impinges on the light detector 23, and the intensity thereof is converted into an electric signal to be fed into the phase detector 27.

Again, the wave form of the driving voltage of the light scanning device 22 is used as a reference signal for the phase detector 27. A positive or negative DC signal appears on the output side, depending upon whether the phase difference between the reference signal and the signal from the light detector 23 is 0° or 180°.

Figure 17:
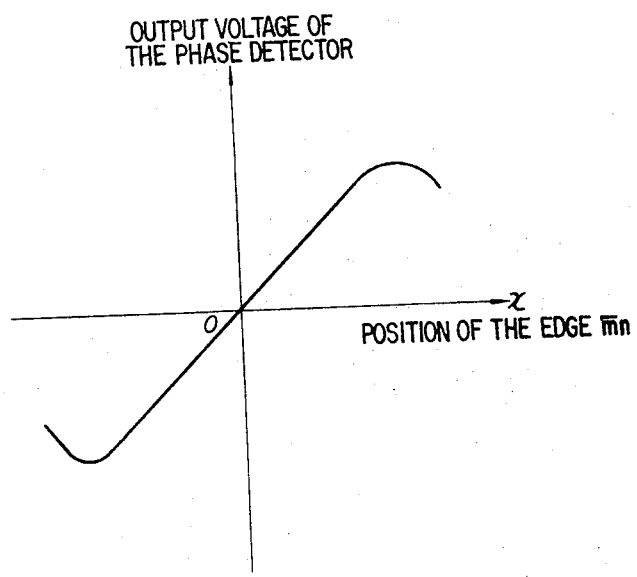
FIG. 17 is a graphical diagram showing an output characteristic of the apparatus of FIG. 13.

The functions of the apparatus, as thus far described, will be explained in more detail with reference to FIGS. 16A – 16D and 16B' to 16D' which are similar to FIGS. 8A – 8D and 8B' – 8D'. FIG. 16A illustrates the progress-versus-time of the scanning wave form of the scanned light. The loci of light beams focused on the density wedge 34 are shown in FIGS. 16B, 16C and 16D. The progress-versus-time of the loci of light beams focused on the density wedge and the progress-versus-time of the intensities of the light transmitted through the density wedge are shown in FIGS. 16B', 16C' and 16D', respectively. The transmission factor characteristic of the density wedge is shown in FIG. 16E. In the respective figures, the time axes are depicted graduated in terms of the phase. FIG. 16B is directed to the case where the edge $\overline{mn}$ (that is, the body to be measured) is displaced in the negative direction of the $x$-axis, and FIG. 16D to the case where it is displaced in the positive direction of the same axis. As apparent from FIG. 16B, when the edge $\overline{mn}$ is coincident with the optical axis $\overline{bo}$, the intensity of the light transmitted through the density wedge varies by two periods during one period of scanning by the parallel light. Thus, as explained above, the intensity of the light transmitted through the density wedge has a frequency component of $2f_o$. When the body to be measured is displaced in the negative direction of the $x$-axis as in FIG. 16C, the light transmitted through the density wedge has a frequency component of $f_o$. When the body to be measured is displaced in the positive direction of the $x$-axis, there is obtained a transmitted light which, as shown in FIG. 16D, has a frequency component of $f_o$ varying in phase by 180° from the case of FIG. 16C. When the displacement is intermediate between the cases of FIGS. 16B and 16C or between those of FIGS. 16B and 16D, the frequency components of $f_o$ and $2f_o$ coexist, and the intensity of the component of $f_o$ is proportional to the displacement, for small displacements. Accordingly, when the output of the light detector 23 is phase-detected, an output characteristic as shown in FIG. 17 is obtained.

The signal is again amplified by the power amplifier 28, the amplified signal is applied to the servomotor 29, and the feed stand 26 is thus driven, whereby the optical axis $\overline{bo}$ may be brought into coincidence with the edge $\overline{mn}$.

When the distance from the edge $\overline{mn}$ to the lens 25 changes, the light locus 31' on the density wedge 34 moves in the $z$-axial direction. If, however, the width of the density wedge in the $z$-axial direction is made sufficiently large so that the light locus 31' does not overlap the density wedge 34, then the change in the detection sensitivity due to the fluctuation in the distance is small. This is an advantageous feature in a case where the distance fluctuations are within approximately ±5mm as in the detection of weld lines.

From the foregoing description, the functions of the FIG. 13 system as a whole are as set forth below.

An indication corresponding to the displacement of the edge of the body to be measured 30 in the $x$ direction, is obtained from the phase detector 27. The servomotor 29 is rotated in response to the indication to thereby move the stand 26 and in turn to move the position of the scanning center to that of the edge. Unless the edge $\overline{mn}$ is moved again, the above state is maintained. If the edge $\overline{mn}$ is displaced, the moving stand 26 effects tracking so as to render the displacement zero.

Accordingly, if, by way of example, the body to be measured is a body to be welded and the edge $\overline{mn}$ is a weld line, the feed stand tracks the weld line. If means are also provided to move the feed stand in the $z$-axial direction, and a welding torch, for example, is placed on the feed stand, the weld line is automatically tracked and the welding carried out even when the weld line is curved.

Again, the apparatus of FIG. 13 is capable of tracking the edge of the specimen with absolutely no physical contact with the specimen.

Obviously, numerous additional modifications and variations of the present invention are possible in light of the above teachings. It is therefore to be understoood that within the scope of the appended claims the invention may be practiced otherwise than as specifically described herein.

What is claimed as new and desired to be secured by letters patent of the United States is:

1. An apparatus for optically tracking a body comprising:
   a source of parallel light for irradiating a portion of said body,
   light scanning means positioned between said source and said body for scanning said parallel light across said portion of said body,
   lens means for condensing light reflected from said portion of said body,
   light detector means for sensing said reflected light and for producing an output signal in response thereto; and,
   control means responsive to said output signal for said light detector means for detecting deviations of said scanning light from said portion of said body, said control means operative to minimize said deviations,
   slit plate means having a slit therein oriented substantially parallel to the scanning direction of said light scanning means,
   said slit plate means positioned between said lens means and said light detector means.

2. An apparatus as in claim 1 for optically tracking a body further comprising:
   an optical density wedge positioned between said lens means and said light detector means,
   said optical density wedge having a transmission factor which varies in a direction orthogonal to the scanning direction of said light scanning means.

3. An apparatus as in claim 1 for optically tracking a body wherein:
   said portion of said body irradiated by said parallel light source is an edge portion.

4. An apparatus as in claim 3 for optically tracking a body wherein:
   said light scanning means deflects light from said source substantially orthogonally with respect to said edge portion.

* * * * *